United States Patent
Matsumura et al.

(10) Patent No.: US 11,541,890 B2
(45) Date of Patent: Jan. 3, 2023

(54) VEHICLE CONTROL DEVICE AND STORAGE MEDIUM WHICH STORES A COMPUTER PROGRAM FOR VEHICLE CONTROL

(71) Applicant: TOYOTA JIDOSHA KABUSHIKI KAISHA, Toyota (JP)

(72) Inventors: Takeshi Matsumura, Toyota (JP); Eiki Kitagawa, Tokyo-to (JP); Yu Okada, Ichikawa (JP); Shota Fujii, Tokyo-to (JP); Naoki Nishimura, Tokyo-to (JP); Yuki Mori, Tokyo-to (JP); Takamitsu Toyoura, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 240 days.

(21) Appl. No.: 17/089,877

(22) Filed: Nov. 5, 2020

(65) Prior Publication Data

US 2021/0188275 A1  Jun. 24, 2021

(30) Foreign Application Priority Data

Dec. 19, 2019 (JP) .............................. JP2019-228958

(51) Int. Cl.
*B60W 30/18* (2012.01)
*B60W 30/16* (2020.01)
(Continued)

(52) U.S. Cl.
CPC ...... *B60W 30/18163* (2013.01); *B60W 30/16* (2013.01); *B60W 50/082* (2013.01);
(Continued)

(58) Field of Classification Search
CPC ............. B60W 60/0053; B60W 30/16; B60W 50/082; B60W 50/14; B60W 2754/30; B60W 2720/106
(Continued)

(56) References Cited

U.S. PATENT DOCUMENTS

2005/0015203 A1   1/2005 Nishira
2016/0325750 A1*  11/2016 Kanda .............. B60W 30/18163
(Continued)

FOREIGN PATENT DOCUMENTS

CN   106064626 B  * 10/2018  ............ B60W 10/04
CN   109823343 A  *  5/2019  ............ B60W 10/04
(Continued)

OTHER PUBLICATIONS

H. Jula et al., "Collision Avoidance Analysis for Lane Changing and Merging," 2000, vol. 49, Publisher: IEEE.*
(Continued)

*Primary Examiner* — Tuan C To
(74) *Attorney, Agent, or Firm* — Dickinson Wright, PLLC

(57) ABSTRACT

A vehicle control device comprises a processor configured to determine a target merge location where the vehicle is to make a lane change from a merging lane to a main lane, in a merge zone on a scheduled route where the merging lane merges with the main lane, as a location that is before the location at the minimum distance to the end point of the merging lane allowing the driver to whom control of the vehicle has been handed over to operate the vehicle for the lane change, and when the vehicle has not completed the lane change upon reaching the target merge location, give the driver a first notification notifying that control of the vehicle will be switched from automatic control to manual control, by using a notifying unit that notifies the driver of information, or by using a vehicle controlling device that
(Continued)

controls operation of the vehicle to perform a predetermined operation of the vehicle.

7 Claims, 7 Drawing Sheets

(51) Int. Cl.
    *B60W 50/14*     (2020.01)
    *B60W 50/08*     (2020.01)
    *B60W 60/00*     (2020.01)

(52) U.S. Cl.
    CPC ........ *B60W 50/14* (2013.01); *B60W 60/0053* (2020.02); *B60W 2720/106* (2013.01); *B60W 2754/30* (2020.02)

(58) Field of Classification Search
    USPC .......................................................... 701/96
    See application file for complete search history.

(56) References Cited

U.S. PATENT DOCUMENTS

| | | |
|---|---|---|
| 2017/0088144 A1 | 3/2017 | Shibata |
| 2017/0334452 A1* | 11/2017 | Abe .................... G05D 1/0088 |
| 2017/0341652 A1 | 11/2017 | Sugawara et al. |
| 2018/0157256 A1 | 6/2018 | Oniwa et al. |
| 2018/0170389 A1* | 6/2018 | Ochida ................. B60W 40/04 |
| 2018/0173226 A1* | 6/2018 | Ochida ................. B60W 50/14 |
| 2018/0173227 A1 | 6/2018 | Mukai et al. |
| 2018/0209801 A1* | 7/2018 | Stentz ................ G01C 21/3415 |
| 2018/0237030 A1* | 8/2018 | Jones .................. B60W 50/082 |
| 2018/0281788 A1* | 10/2018 | Uchida .................... G08G 1/16 |
| 2018/0297611 A1 | 10/2018 | Fujisawa et al. |
| 2019/0039627 A1 | 2/2019 | Yamamoto |
| 2019/0041652 A1* | 2/2019 | Murayama ........... G05D 1/0088 |
| 2019/0111931 A1* | 4/2019 | Matsunaga ....... B60W 30/0956 |
| 2019/0235515 A1* | 8/2019 | Shirvani ................ G06V 10/82 |
| 2019/0263411 A1* | 8/2019 | Saikyo ............ B60W 30/18163 |
| 2019/0265697 A1 | 8/2019 | Hashimoto et al. |
| 2019/0265700 A1 | 8/2019 | Honda et al. |
| 2020/0094837 A1* | 3/2020 | Kato .................... G05D 1/0214 |
| 2020/0307691 A1* | 10/2020 | Kalabic ................ B62D 15/025 |
| 2021/0323556 A1* | 10/2021 | Matsumura ....... B60W 60/0015 |

FOREIGN PATENT DOCUMENTS

| | | | |
|---|---|---|---|
| JP | H10320691 A | | 12/1998 |
| JP | 2005038325 A | | 2/2005 |
| JP | 2015158469 A | * | 9/2015 |
| JP | 2016126360 A | | 7/2016 |
| JP | 2017062739 A | | 3/2017 |
| JP | 2017107308 A | | 6/2017 |
| JP | 2017133893 A | | 8/2017 |
| JP | 2018095218 A | | 6/2018 |
| JP | 2019089546 A | | 6/2019 |
| JP | 2019149144 A | | 9/2019 |
| WO | 2017/064941 A1 | | 4/2017 |
| WO | 2017159493 A1 | | 9/2017 |
| WO | 2018/105037 A1 | | 6/2018 |

OTHER PUBLICATIONS

A. Kanaris et al., "Strategies and Spacing Requirements for Lane Changing and Merging in Automated Highway Systems," 2001, vol. 50, Publisher: IEEE.*

Gil et al., "Traffic Simulation of Lane-Merging of Autonomous Vehicles in the Context of Platooning," 2018, Publisher: IEEE.*

* cited by examiner

VEHICLE CONTROL DEVICE AND STORAGE MEDIUM WHICH STORES A COMPUTER PROGRAM FOR VEHICLE CONTROL

FIELD

The present invention relates to a vehicle control device and to a storage medium which stores a computer program for vehicle control.

BACKGROUND

Self-driving control for a vehicle is accomplished by creating a scheduled route for the vehicle based on the location of the vehicle, the destination of the vehicle and map data, and controlling the vehicle to travel along the scheduled route.

When a merge zone is included in the scheduled route, where a merging lane merges with a main lane, the vehicle is automatically controlled to change from the merging lane to the main lane of the merge zone.

When a vehicle changes lanes in a merge zone, its running motion is controlled so as to maintain a safe distance between itself and other vehicles.

International Publication No. 2017/159493, for example, proposes a method whereby the success probability of a lane change from a merging lane to a main lane is derived by referring to correspondence information in which success probability is matched both with information obtained from a traffic information source and the length of the merging zone, and based on the derivation success probability, it is judged whether or not a lane change can be made from the merging lane to the main lane.

When it cannot be ensured that the vehicle will have a safe distance between itself and other vehicles, travel on the current merging lane is continued without a lane change until the situation changes allowing a safe distance to be ensured between itself and other vehicles.

Since the vehicle travels in the merging lane while it is waiting to make the lane change, the vehicle proceeds toward the end point of the merging lane when a lane change cannot be made by automatic control.

International Publication No. 2017/159493 proposes switching the vehicle control from automatic control to manual control when it has been judged that a lane change from the merging lane to the main lane cannot be made by automatic control, so that the driver can operate the vehicle manually for lane change from the merging lane to the main lane.

SUMMARY

When the driver in a vehicle that is being automatically controlled is notified that control is to be handed over when it has become impossible to make a lane change from the merging lane to the main lane, there is a risk that insufficient time will remain for the vehicle to make a lane change from the merging lane to the main lane by manual control.

It is therefore an object of the present invention to provide a vehicle control device that gives a notification when control is to be handed over, so that the driver to which control of the vehicle has been handed over is able to perform an operation of lane change of a vehicle from a merging lane to a main lane, with an ample amount of time.

One embodiment of the invention provides a vehicle control device. The vehicle control device comprises a processor configured to determine a target merge location where the vehicle is to make a lane change from a merging lane to a main lane, in a merge zone on a scheduled route where the merging lane merges with the main lane, as a location that is before the location at the minimum distance to the end point of the merging lane allowing the driver to whom control of the vehicle has been handed over to operate the vehicle for the lane change, and when the vehicle has not completed the lane change upon reaching the target merge location, give the driver a first notification notifying that control of the vehicle will be switched from automatic control to manual control, by using a notifying device that notifies the driver of information, or by using a vehicle controlling device that controls operation of the vehicle to perform a predetermined operation of the vehicle.

In this vehicle control device, the processor is preferably configured to control the vehicle controlling device to either reduce the speed of the vehicle or to vary the speed of the vehicle so that the difference with the speed of the other vehicle traveling in the main lane is reduced, as a predetermined operation.

The processor in this vehicle control device is also preferably configured to determine a merge completion target location, which is the target where lane change of the vehicle from a merging lane to a main lane is to be completed, between the target merge location and the minimum distance location, and when the vehicle has reached the merge completion target location after the first notification, give a second notification notifying that control of the vehicle may be switched from automatic control to manual control to the driver, by using the notifying device or vehicle controlling device.

In this vehicle control device, the processor is preferably configured to change the acceleration of the vehicle by braking action or steering action by using the vehicle controlling device in order to give the driver the second notification.

The processor in this vehicle control device is also preferably configured to notify information indicating that the vehicle is to make a lane change from the merging lane to the main lane by using the notifying device to the driver, after the target merge location has been determined.

Furthermore, the processor in this vehicle control device is preferably configured to determine the minimum distance location based on the location of the end point of the merging lane, the current location of the vehicle and the vehicle status information.

According to one embodiment, a computer readable non-transitory storage medium which stores a computer program for vehicle control is provided. The computer readable non-transitory storage medium which stores a computer program for vehicle control causes a processor to determine a target merge location where the vehicle is to complete a lane change from a merging lane to a main lane, in a merge zone on a scheduled route where the merging lane merges with the main lane, as a location that is before the location at the minimum distance to the end point of the merging lane allowing the driver to whom control of the vehicle has been handed over to operate the vehicle for the lane change, and when the vehicle has not completed the lane change upon reaching the target merge location, give the driver a notification notifying that control of the vehicle will be switched from automatic control to manual control, by using a notifying device that notifies the driver of information, or by using a vehicle controlling device that controls operation of the vehicle to perform a predetermined operation of the vehicle.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

The vehicle control device will now be described with reference to the accompanying drawings. For a merge zone where a merging lane merges with a main lane on a scheduled route, the vehicle control device determines the target merge location where the vehicle is to make a lane change from the merging lane to the main lane, to be a location that is before the location at the minimum distance to the end point of the merging lane allowing the driver to whom control of the vehicle has been handed over to operate the vehicle for the lane change. When the lane change has not been completed by the time the vehicle has reached the target merge location, the vehicle control device either gives the driver a first notification notifying that control of the vehicle will be switched from automatic control to manual control, by using the notifying device, or gives the driver a notification by using the vehicle controlling device that controls operation of the vehicle to perform a predetermined operation of the vehicle. Since the driver is notified in advance that it is difficult to make a lane change from the merging lane to the main lane by automatic control before the vehicle can no longer make a lane change by automatic control, the driver to whom control of the vehicle has been handed over has ample time to carry out the procedure of lane change of the vehicle from the merging lane to the main lane.

The vehicle control system of the vehicle control device of the embodiment has an automatic control operating mode in which the vehicle is operated by automatic control, and a manual control operating mode in which the driver operates the vehicle manually. When the driver has acknowledged the notification of control change from automatic control to manual control, the vehicle control system in the automatic control operating mode switches operation of the vehicle from the currently applied automatic control operating mode to manual control operating mode. This allows the driver to operate the vehicle by manual control for the lane change, when the vehicle cannot perform the lane change by automatic control. In the manual control operating mode, at least one operation of the vehicle from among driving, braking and steering is controlled manually.

Figure 1:
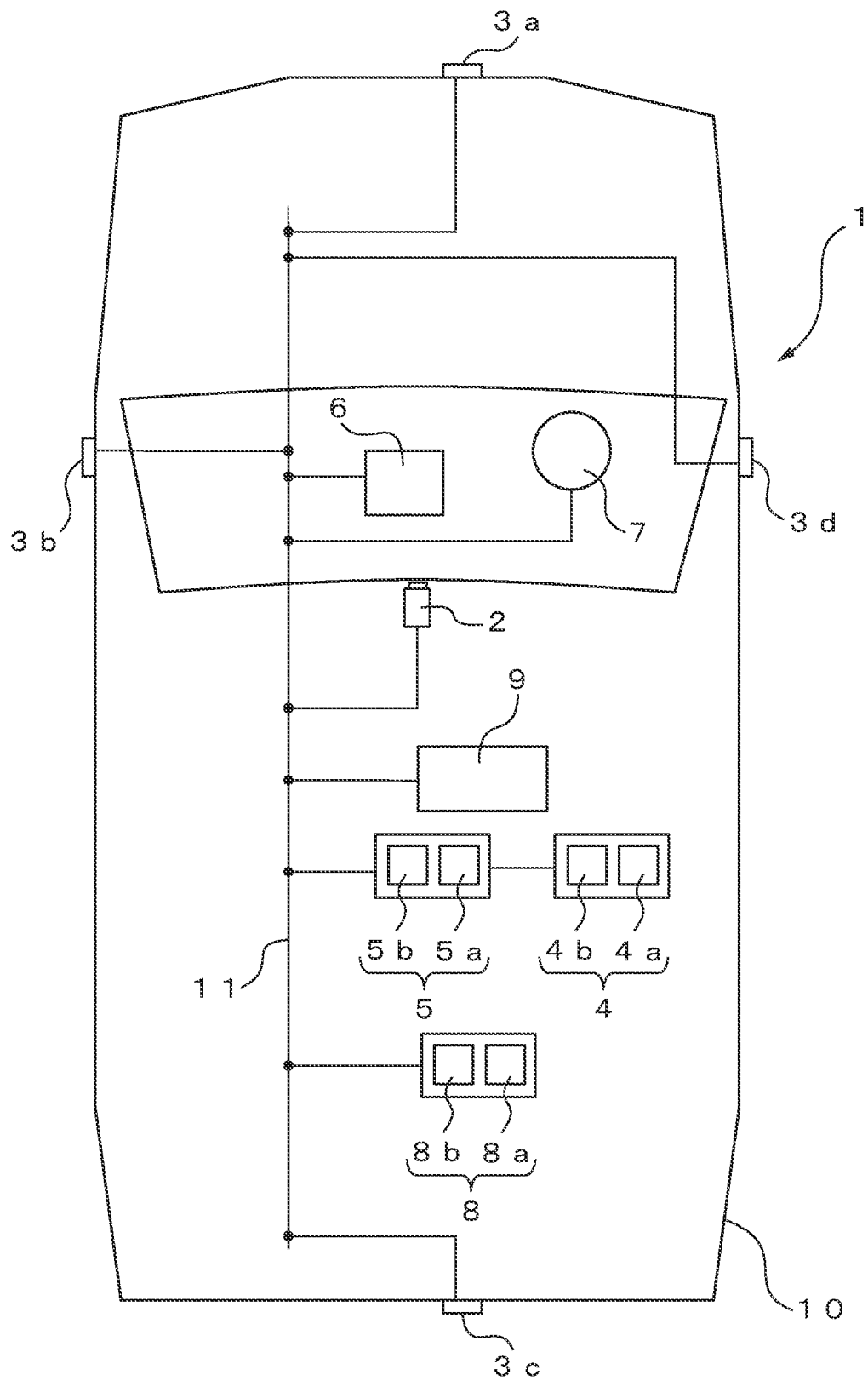
FIG. 1 is a general schematic drawing of a vehicle control system equipped with a vehicle control device.
Figure 2:
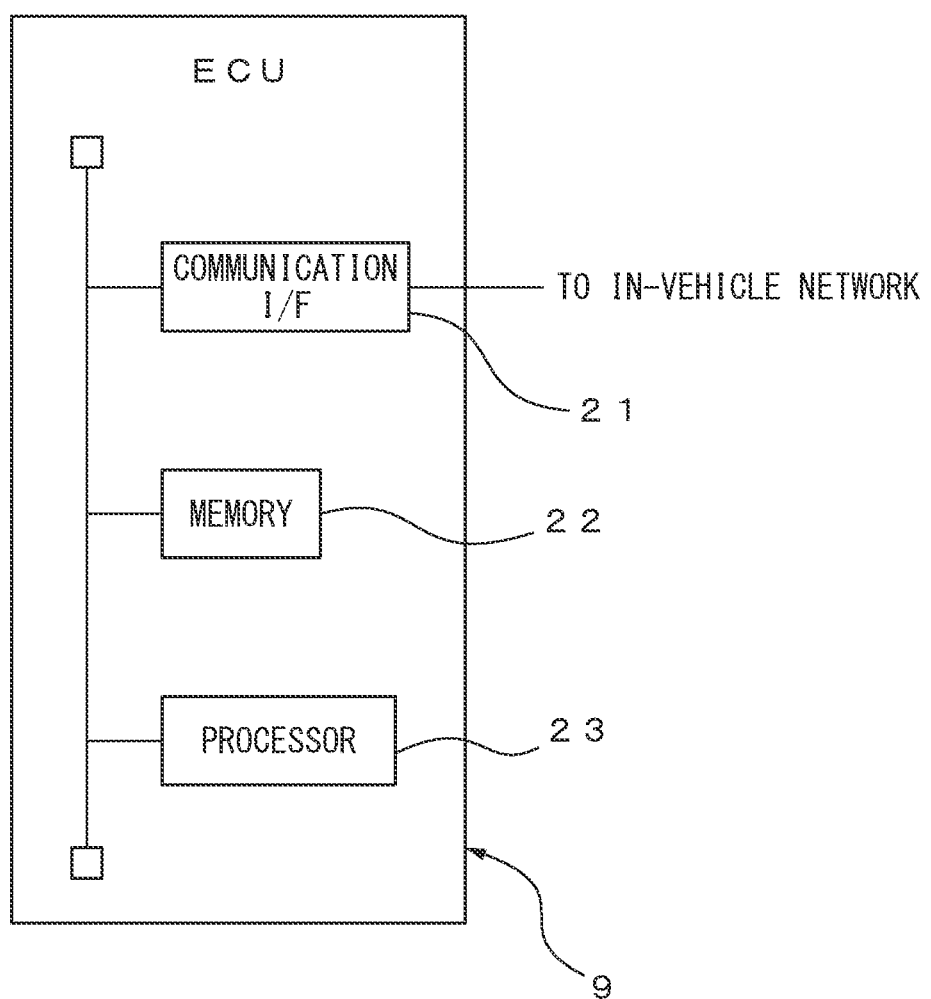
FIG. 2 is a hardware configuration diagram of an electronic control unit as an embodiment of the vehicle control device.

FIG. 1 is a general schematic drawing of a vehicle control system equipped with a vehicle control device. FIG. 2 is a hardware configuration diagram of an electronic control unit as an embodiment of the vehicle control device.

For this embodiment, the vehicle control system 1 that is mounted in the vehicle 10 and controls the vehicle 10 has a camera 2 that takes a forward image of the vehicle, and LiDAR sensors 3a to 3d situated on the front and rear and left and right sides of the vehicle 10. The vehicle control system 1 also has a positioning information receiver 4, a map information storage device 5 that produces map information based on positioning information output by the positioning information receiver 4, a user interface (UI) 6, an operating device 7, a navigation device 8, and an electronic control unit (ECU) 9 as an example of a vehicle control device.

The camera 2, LiDAR sensors 3a to 3d, map information storage device 5, UI 6, operating device 7, navigation device 8 and ECU 9 are connected in a communicable manner through an in-vehicle network 11 conforming to the Controller Area Network standard.

The camera 2 is mounted inside the compartment of the vehicle 10 and directed toward the front of the vehicle 10. The camera 2 produces an image in which a predetermined region that is ahead of the vehicle 10 is shown at an image information acquisition time set with a predetermined cycle. The image that is produced shows other vehicles around the vehicle 10, or outside features such as road surface lane marking lines that are within the predetermined region ahead of the vehicle 10. The image produced by the camera 2 may be a color image or a gray image. The camera 2 is an example of an imaging unit, and it has a 2D detector composed of an array of photoelectric conversion elements with visible light sensitivity, such as a CCD or C-MOS, and an imaging optical system that forms an image of the photographed region on the 2D detector.

The camera 2 outputs the image and the image information acquisition time during which the image was produced, through the in-vehicle network 11, to the ECU 9 each time an image is produced. At the ECU 9, the image is used for processing to estimate the location of the vehicle, and for processing to detect any other objects around the vehicle 10.

The LiDAR sensors 3a to 3d are mounted on the outer sides of the vehicle 10, for example, being directed toward the front, the left, the rear and the right of the vehicle 10, respectively. The LiDAR sensors 3a to 3d respectively emit a pulsed laser ahead, to the left, behind and to the right of the vehicle 10, in a synchronized manner, at a distance information acquisition time set with a predetermined cycle, and receive reflected waves that have been reflected from a reflector. The time required for the reflected wave to return contains information for the distance between the vehicle 10 and outside features located in the direction in which the laser has been emitted. Each of the LiDAR sensors 3a to 3d outputs the reflected wave information that includes the laser emission direction and the time required for the reflected wave to return, together with the reflected wave information acquisition time at which the laser was emitted, through the in-vehicle network 11 to the ECU 9. The reflected wave information is used for processing by the ECU 9 to detect other objects around the vehicle 10.

The positioning information receiver 4 outputs positioning information that represents the current location of the vehicle 10. The positioning information receiver 4 may be a GPS receiver, for example. The positioning information receiver 4 has a positioning information receiver 4a that receives GPS radio waves, and a processor 4b that outputs positioning information representing the current location of the vehicle 10, based on the GPS radio waves received by the positioning information receiver 4a. The processor 4b outputs positioning information and positioning information acquisition time at which the positioning information has been acquired, to the map information storage device 5 each time positioning information is acquired by the positioning information receiver 4a at a predetermined receiving cycle.

The map information storage device 5 has a processor 5a and a storage device 5b such as a magnetic disk drive or a non-volatile semiconductor memory, the storage device 5b storing wide-area map information for a relatively wide area that includes the current location of the vehicle 10 (for example, a range of 10 to 30 square km). The wide-area map information is preferably high precision map information including information for the types and locations of structures or outside features such as road lane marking lines, and the legal speed limit for the road. The locations of road outside features and structures are represented by the world coordinate system, with a predetermined reference location in real space as the origin. The processor 5a receives the wide-area map information from an external server via a base station, by wireless communication through a wireless communication device (not shown), in relation to the current location of the vehicle 10, and stores it in the storage device 5b. With reference to the wide-area map information stored in the storage device 5b, the processor 5a outputs the map information for a relatively narrow area including the current location represented by the positioning information (for example, an area of 100 square m to 10 square km), the positioning information and the positioning information acquisition time via the in-vehicle network 11 to the ECU 9, each time positioning information is input from the positioning information receiver 4. The processor 5a of the map information storage device 5 outputs the positioning information and positioning information acquisition time through the in-vehicle network 11 to the navigation device 8, each time positioning information and positioning information acquisition time are input from the positioning information receiver 4.

The UI 6 is an example of the notifying unit. The UI 6 is controlled by the ECU 9, and the driver is given notification of the traveling information of the vehicle 10 and a control change notification that control of the vehicle 10 has been changed from automatic control to manual control, while an operation signal for operation of the vehicle 10 is produced by the driver. The traveling information of the vehicle 10 includes information relating to the current and future routes of the vehicle including the location of the vehicle, the scheduled route, and the lane change plan. The traveling information of the vehicle 10 may also include information relating to lane change of the vehicle 10 from the merging lane to the main lane, for example. The UI 6 has a liquid crystal display or touch panel, for example, as a notification device for giving the driver traveling information and control change notification. The UI 6 also has a touch panel or operating button, for example, as an input device for inputting operation information from the driver to the vehicle 10. The operation information may be, for example, destination, transit points, vehicle speed and other vehicle control information, as well as the response of the driver to the control change notification. The UI 6 outputs input operation information through the in-vehicle network 11 to the ECU 9.

The operating device 7 has a steering wheel, an accelerator pedal and a brake pedal for manual operation of the vehicle 10 by the driver when the vehicle 10 is in manual control operating mode. The operating device 7 generates a control signal corresponding to the amount of steering in a steering operation by the driver, and outputs it to an actuator (not shown) which controls the steering wheel of the vehicle 10. The operating device 7 generates a control signal corresponding to the degree of opening of the accelerator in an accelerator pedal operation by the driver, and outputs it to a drive unit (not shown) such as the engine of the vehicle 10. The operating device 7 also generates a control signal corresponding to the amount of braking in a brake pedal operation by the driver, and outputs it to the brake (not shown) of the vehicle 10.

The navigation device 8 produces a scheduled route from the current location of the vehicle 10 to the destination, based on navigating map information, the destination of the vehicle 10 and the current location of the vehicle 10. The navigation device 8 has a memory 8a that stores the navigating map information, and a processor 8b. The navigating map information includes link positional information representing the road, and positional information of nodes that are connected by the links. The road configuration on the scheduled route is represented by links representing the roads, and nodes connected by the links. The link and node locations are represented as coordinates on the world coordinate system, for example. The processor 8b produces a scheduled route from the current location of the vehicle 10 to the destination, based on navigating map information stored in a memory 8a, the destination of the vehicle 10 received from the UI 6, and positioning information representing the current location of the vehicle 10, received from the map information storage device 5. The processor 8b produces a scheduled route for the vehicle 10 using the Dijkstra method, for example. The scheduled route includes information relating to the locations of right turns, left turns, merging and branching. The processor 8b produces a new scheduled route for the vehicle 10 when a new destination has been set or when the current location of the vehicle 10 is outside of the scheduled route. The processor 8b outputs the scheduled route through the in-vehicle network 11 to the ECU 9 each time a scheduled route is generated.

The ECU 9 controls traveling of the vehicle 10 according to the implemented operating mode. For this embodiment, when automatic control operating mode is active, the ECU 9 performs lane change processing in a merge zone where a merging lane merges with a main lane on the scheduled route, whereby the vehicle 10 changes from the merging lane to the main lane, and when it has been judged that the lane change cannot be made by automatic control, it performs control change notification processing whereby the driver is given notification of change of the vehicle 10 control from automatic control to manual control. For this purpose, the ECU 9 has a communication interface 21, a memory 22 and a processor 23.

The communication interface (I/F) 21 is an example of a communication unit, and it has an interface circuit to connect the ECU 9 with the in-vehicle network 11. Specifically, the communication interface 21 is connected with the UI 6 via the in-vehicle network 11. The communication interface 21 receives information from the ECU 9 notifying that control of the vehicle 10 is to change from automatic control to manual control, and sends the received information to the UI 6. When it receives an operation signal from the UI 6 indicating a lane change or the driver's response to the control change notification, the communication interface 21 passes the received information to the processor 23. The communication interface 21 is connected with the camera 2 and map information storage device 5, for example, via the in-vehicle network 11. Each time an image and image information acquisition time are received from the camera 2, for example, the communication interface 21 passes the received image and image information acquisition time to the processor 23. Each time map information, positioning information and positioning information acquisition time are received from the map information storage device 5, the communication interface 21 passes the received map information, positioning information and positioning information acquisition time to the processor 23. The communication interface 21 passes the vehicle speed, acceleration and yaw rate, received from a vehicle speed sensor, acceleration sensor and yaw rate sensor (not shown), to the processor 23.

The memory 22 is an example of a memory unit, and it has a volatile semiconductor memory and a non-volatile semiconductor memory, for example. The memory 22 stores various data to be used in vehicle control processing carried out by the processor 23 of the ECU 9, installation location information such as the optical axis direction and mounting position of the camera 2, and internal parameters such as the focal length and viewing angle of the imaging optical system. The memory 22 also stores internal parameters such as the installation locations of the LiDAR sensors 3a to 3d and their operable ranges. The memory 22 additionally stores the scheduled route received from the navigation device 8, the image and image information acquisition time received from the camera 2, and the map information, positioning information and positioning information acquisition time received from the map information storage device 5.

The processor 23 comprises one or more CPUs (Central Processing Units) and their peripheral circuits. The processor 23 may also have other computing circuits such as a logical operation unit, numerical calculation unit or graphic processing unit. When the processor 23 has multiple CPUs, it may have a separate memory for each CPU. The processor 23 carries out location estimation processing whereby the location of the vehicle 10 is estimated based on the image produced by the camera 2, at the image information acquisition time when the image was produced. The processor 23 also updates the location of the vehicle 10 at a positioning time set within a predetermined cycle, using vehicle status information for the estimated location and the vehicle speed of the vehicle 10 at the latest image information acquisition time. The processor 23 also controls the running motion of the vehicle 10 based on the relative positional relationship between the estimated location of the vehicle 10, the destination of the vehicle 10 and other objects around the vehicle 10. The processor 23 additionally carries out lane change processing whereby the vehicle 10 makes a lane change from a merging lane to a main lane in a merge zone where the merging lane merges with the main lane on the scheduled route, and when it has been judged that the lane change cannot be made by automatic control, it carries out control change notification processing whereby it either gives the driver a first notification notifying that control of the vehicle 10 will be changed from automatic control to manual control, by using a notifying device such as the UI 6, or it gives the driver a notification by carrying out a prescribed operation for the vehicle 10 using the vehicle controlling device that controls operation of the vehicle 10.

Figure 3:
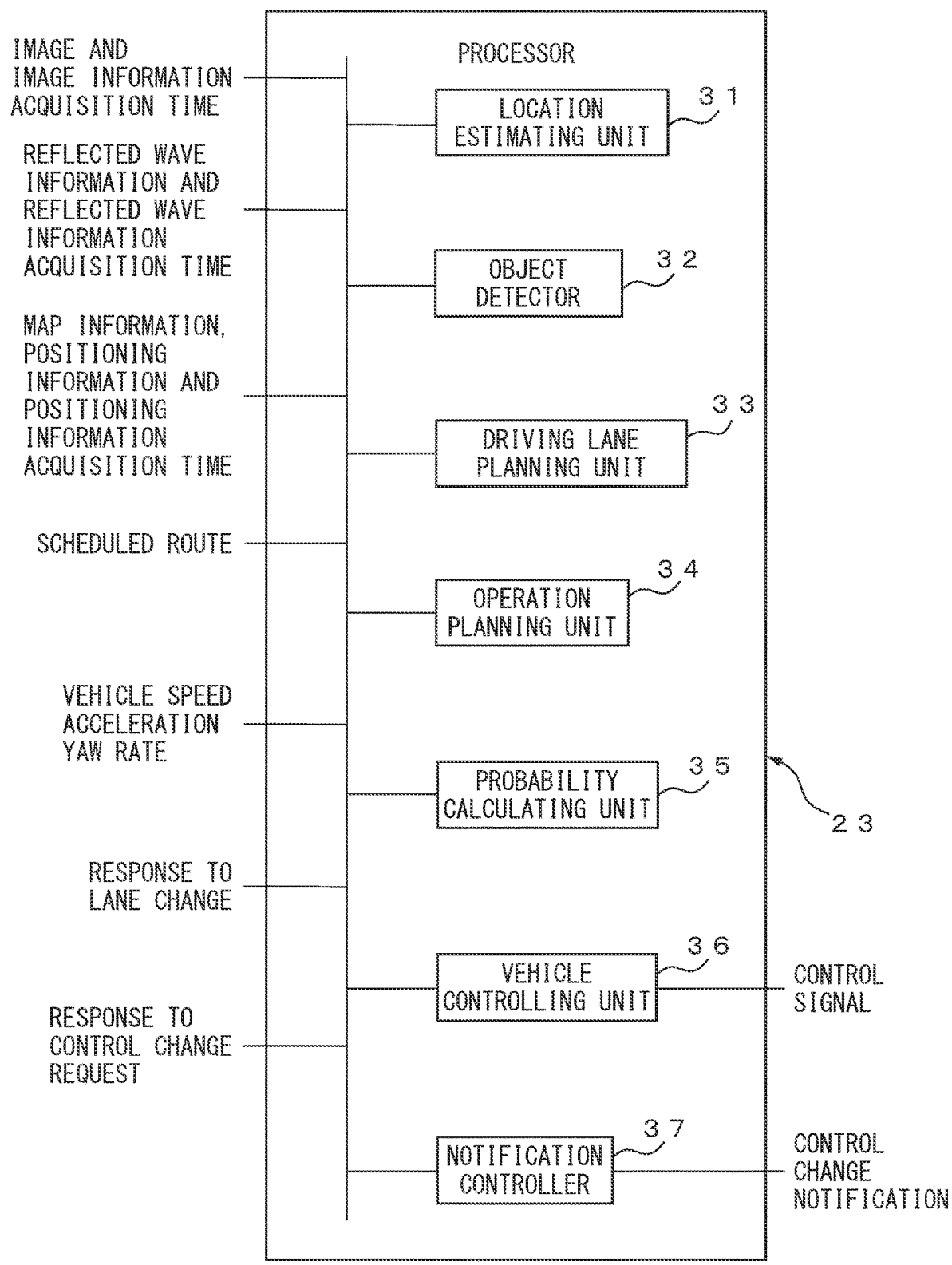
FIG. 3 is a functional block diagram of a processor of an electronic control unit, as it relates to vehicle control processing.

FIG. 3 is a functional block diagram of the processor 23 of the ECU 9, as it relates to the vehicle control processing including lane change processing and control change notification processing. The processor 23 has a location estimating unit 31, an object detector 32, a driving lane planning unit 33, an operation planning unit 34, a probability calculating unit 35, a vehicle controlling unit 36 and a notification controller 37. All or some of the units of the processor 23 are functional modules driven by a computer program operating on the processor 23, for example. Alternatively, all or some of the units of the processor 23 may be specialized computing circuits in the processor 23. Of the units of the processor 23, the driving lane planning unit 33, the operation planning unit 34, the vehicle controlling unit 36 and the notification controller 37 carry out lane change processing from the merging lane to the main lane in the merge zone, and vehicle control processing for control change notification processing when it has been judged that the lane change cannot be made by automatic control.

The location estimating unit 31 of the processor 23 estimates the location of the vehicle 10 based on outside features around the vehicle 10. The location estimating unit 31 detects lane marking lines by entering a matching region for detection of lane marking lines formed in the image of the camera 2, as an example of outside features around the vehicle 10, into a discriminator that discriminates the lane marking lines in the image. The discriminator may use a deep neural network (DNN) that has been trained to detect lane marking lines represented in input images, for example. Determining an assumed location and orientation of the vehicle 10, the location estimating unit 31 projects the lane marking lines represented in the map information received from the map information-generating device 5, onto the image of the camera 2 produced at the current image information acquisition time. For example, the location estimating unit 31 determines that the assumed location and assumed orientation of the vehicle 10 are the location of the vehicle 10 represented by the positioning information received from the positioning information receiver 5 at the current image information acquisition time, and the orientation of the vehicle 10 corresponding to the traveling direction of the vehicle 10 as obtained just previously. Based on the assumed location and assumed orientation, the location estimating unit 31 determines a conversion formula from the world coordinate system to the camera coordinate system with the location of the camera 2 as the origin, and with the optical axis direction of the camera 2 as one axial direction. The conversion formula is represented as a combination between a rotation matrix representing rotation within the coordinate system and a translation vector representing parallel movement within the coordinate system. Using the conversion formula, the location estimating unit 31 converts the coordinates of the lane marking lines on the road around the vehicle 10, which are represented in the world coordinate system and included in the map information, to coordinates in the camera coordinate system. The location estimating unit 31 projects the lane marking lines around the vehicle 10 which are represented in the camera coordinate system, onto the image of the camera 2 produced at the current image information acquisition time, based on the focal length of the camera 2 as an internal parameter of the camera 2. The location estimating unit 31 also calculates the degree of coincidence between the lane marking lines detected from the image of the camera 2 and the lane marking lines around the vehicle 10 represented on the map. The location estimating unit 31 carries out processing such as coordinate system conversion, projection and degree of coincidence calculation as described above, while varying the assumed location and assumed orientation by a predetermined amount, to calculate the degree of coincidence between the lane marking lines around the vehicle 10 represented in the map information and the lane marking lines detected from the image, for each of a plurality of assumed locations and assumed orientations. The location estimating unit 31 also identifies the assumed location and assumed orientation for the maximum degree of coincidence, sets the assumed location as the estimated location of the vehicle 10, and based on that assumed orientation, determines the estimated declination (azimuth) representing the traveling direction of the vehicle 10.

At a positioning time set with a shorter cycle than the cycle of the image information acquisition time at which the camera 2 produced the image, the location estimating unit 31 estimates the estimated location of the vehicle 10 and the estimated declination of the vehicle 10 at the positioning time, based on the estimated location and estimated declination of the vehicle 10, estimated at the image information acquisition time immediately before that positioning time, and the amount of movement and moving direction of the vehicle 10 between the image information acquisition time and the positioning time. The location estimating unit 31 performs time-integration of the speed of the vehicle 10 to determine the amount of movement of the vehicle 10 between the image information acquisition time and positioning time, and time-integration of the yaw rate of the vehicle 10 to determine the moving direction of the vehicle 10 between the image information acquisition time and positioning time. The location estimating unit 31 estimates the road driving lane where the vehicle 10 is located, based on the map information and on the estimated location and estimated declination of the vehicle 10. The location estimating unit 31 also assesses, for example, whether the vehicle 10 is traveling in a traffic lane defined by two mutually adjacent lane marking lines situated on either side of the center location of the vehicle 10 in the lateral direction. Each time the estimated location, estimated declination and driving lane of the vehicle 10 are determined at the positioning time, the location estimating unit 31 gives notification of this information to the object detector 32, driving lane planning unit 33, operation planning unit 34, vehicle controlling unit 36 and notification controller 37. When no positioning information is available at a positioning reception time matching the image information acquisition time, the location estimating unit 31 may estimate the estimated location of the vehicle 10 and the orientation of the vehicle 10 at the image information acquisition time, based on the amount of movement and moving direction of the vehicle 10 between the image information acquisition time and the positioning reception time.

The object detector 32 of the processor 23 detects other objects around the vehicle 10, and their type, based on the image produced by the camera 2. Other objects also include other vehicles traveling around the vehicle 10. The object detector 32 detects objects represented in the image produced by the camera 2, by inputting the image into a discriminator, for example. The discriminator may use a deep neural network (DNN) that has been trained to detect objects represented in input images, for example. The object detector 32 used may also be a discriminator other than a DNN. For example, the discriminator used by the object detector 32 may be a support vector machine (SVM) that has been trained to output a confidence factor for representation of objects to be detected in the window, with the input being a feature descriptor (such as Histogram of Oriented Gradients, HOG, for example) calculated from a window set in the image. Alternatively, the object detector 32 may detect an object region by template matching between the image and a template in which an object to be detected is represented. The object detector 32 may also detect other objects around the vehicle 10 based on reflected wave information output by the LiDAR sensors 3a to 3d. The object detector 32 may also determine the orientation of another object with respect to the vehicle 10 based on the location of the other object in the image produced by the camera 2, and may determine the distance between the other object and the vehicle 10, based on the orientation and on the reflected wave information output by the LiDAR sensors 3a to 3d. The object detector 32 estimates the location of the other object represented in a world coordinate system, for example, based on the current location of the vehicle 10 and the distance of the other object from the vehicle 10 and its orientation. The object detector 32 may also track another object to be detected from an updated image, by matching other objects detected in the updated image produced by the camera 2 with objects detected in previous images, according to a tracking process based on optical flow. The object detector 32 may also calculate the trajectory of another object being tracked, based on the location of the object in an image updated from a previous image, represented in the world coordinate system. The object detector 32 can estimate the speed of another object with respect to the vehicle 10, based on changes in the location of the object over the course of time. The object detector 32 can also estimate the acceleration of another object based on changes in the speed of the object over the course of time. In addition, the object detector 32 can identify the driving lane in which the other object is traveling, based on the lane marking lines represented in the map information and the location of the object. The object detector 32 also assesses, for example, whether another object is traveling in a traffic lane defined by two mutually adjacent lane marking lines situated on either side of the center location of the other object in the lateral direction. The object detector 32 notifies the operation planning unit 34 of information representing the type of the detected other object (such as a vehicle type), information indicating its location, and also its speed, acceleration and driving lane.

Based on the map information, the scheduled route of the vehicle 10 to the destination and the current location of the vehicle 10, and at a driving lane-planning time set in a predetermined cycle, the driving lane planning unit 33 of the processor 23 selects a traffic lane on the road on which the vehicle 10 is traveling, within the nearest driving zone (for example, 10 km) selected from the scheduled route, and produces a driving lane plan representing the scheduled driving lane for the vehicle 10 to travel on. The driving lane planning unit 33 also assesses whether or not a lane change is necessary within the nearest driving zone selected from the scheduled route, based on the map information, the scheduled route and the current location of the vehicle 10. The driving lane planning unit 33 may further utilize surrounding environment information or vehicle status information for assessment of whether or not a lane change is necessary. The surrounding environment information includes the locations and speeds of other vehicles traveling around the vehicle 10. The vehicle status information includes the current location of the vehicle 10, and the vehicle speed, acceleration and traveling direction. The driving lane planning unit 33 assesses whether or not a lane change is necessary in a predetermined zone on the scheduled route, and creates a driving lane plan that includes any necessary lane change and the traffic lane before and after the lane change when a lane change is necessary. Each time a driving lane plan is created, the driving lane planning unit 33 notifies the operation planning unit 34 and notification controller 37 of the driving lane plan. Specifically, the driving lane planning unit 33 selects the nearest driving zone from the scheduled route notified from the navigation device 8, at the driving lane-planning time set with the predetermined cycle, selects a traffic lane on the road on which the vehicle 10 is traveling within the driving zone, and creates a driving lane plan. The driving lane planning unit 33 also assesses, based on the scheduled route and the current location of the vehicle 10, whether or not there exists an event location in which at least one of the following events is occurring: the vehicle 10 is approaching another merging road from the road on which it is currently traveling (merge), the vehicle 10 is making a right turn, the vehicle 10 is making a left turn, or, the vehicle 10 is exiting from the road on which it is currently traveling to another branching road (branch). When the driving zone includes an event location, the driving lane planning unit 33 assesses whether or not a lane change is necessary. Specifically, the driving lane planning unit 33 assesses whether or not the traffic lane in which an event is carried out at an event location is the same as the traffic lane in which the vehicle 10 is currently traveling, and when it is different, it assesses whether or not it is necessary to make a lane change, and creates a driving lane plan that includes the traffic lane before and the traffic lane after the lane change. If it is predicted that the vehicle 10 will impact with another vehicle if that other vehicle is traveling in the same traffic lane as the one in which the vehicle 10 is traveling and the vehicle 10 continues to travel in that same lane, then the driving lane planning unit 33 assesses that it is necessary to make a lane change, and creates a driving lane plan that includes the traffic lane before and the traffic lane after the lane change.

An example of processing by the driving lane planning unit 33 to create a driving lane plan will now be explained with reference to FIG. 4 which shows an approach (merge) from a road on which the vehicle 10 is currently traveling to another merging road.

Figure 4:
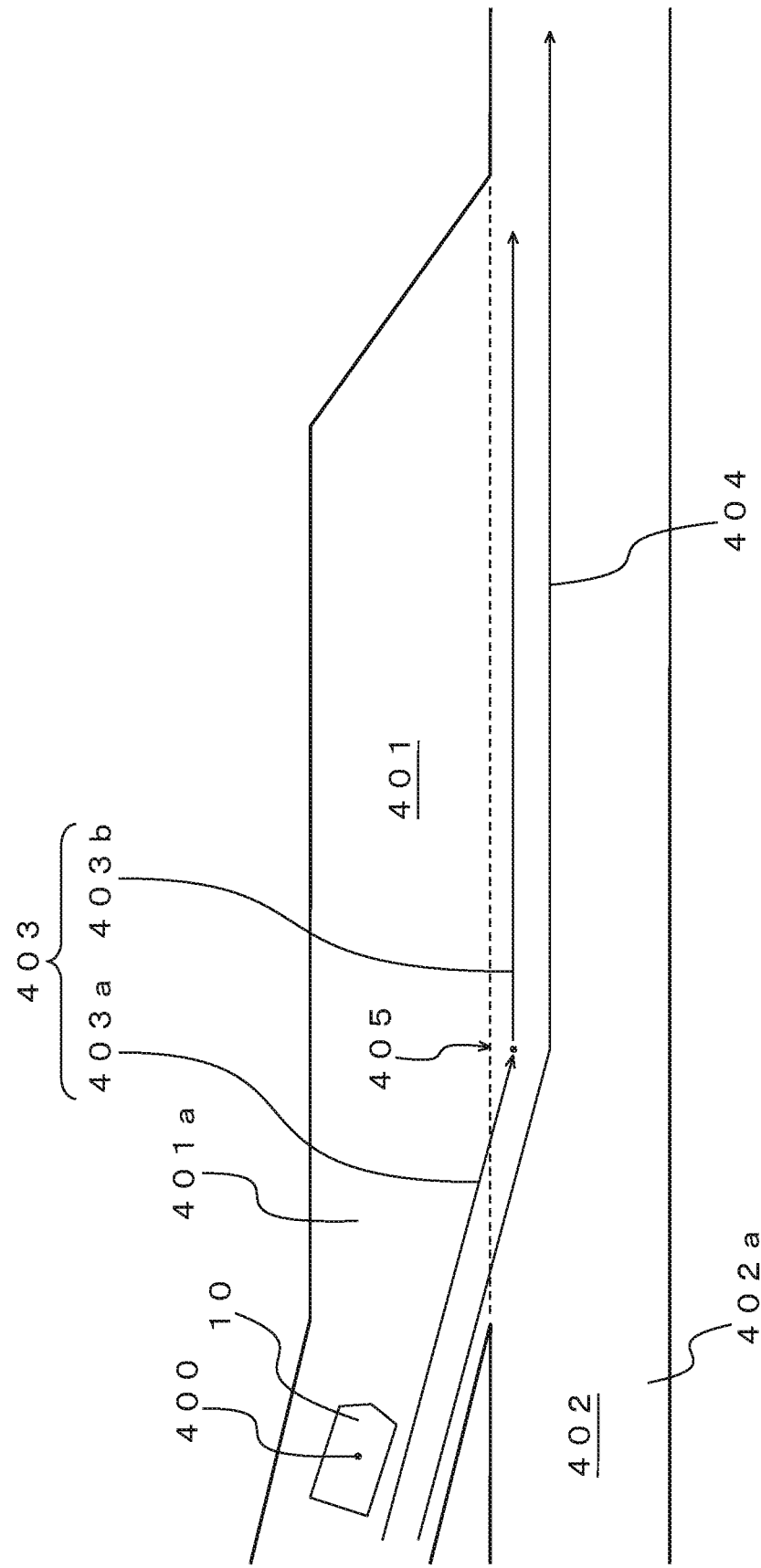
FIG. 4 is a diagram illustrating the process of producing a scheduled driving lane plan for a merge zone.

In the example shown in FIG. 4, where the driving zone includes a merge zone that is an event location, the driving lane planning unit 33 assesses whether or not the traffic lane in which the event is to be carried out within the merge zone is the same as the traffic lane in which the vehicle 10 is currently traveling, based on the map information, the scheduled route and the current location of the vehicle 10. When the traffic lane in which the event is to be carried out within the merge zone is different from the traffic lane in which the vehicle 10 is currently traveling, the driving lane planning unit 33 assesses that it is necessary to make a lane change, and creates a driving lane plan that includes moving from the traffic lane in which the vehicle 10 is currently traveling to the traffic lane in which the event is to be carried out within the merge zone.

In the example shown in FIG. 4, the scheduled route 403 for the vehicle 10 includes a route 403a on a road 401, and a route 403b on a road 402 with which the road 401 merges. The current location 400 of the vehicle 10 is on the route 403a. The route 403b is a future route on which the vehicle 10 will travel. The current driving zone 404 includes a merge zone 405 where the road 401 on which the vehicle 10 is currently traveling merges with the other road 402. The driving lane planning unit 33 assesses that the merge zone 405, in which the road 401 on which the vehicle 10 is currently traveling approaches the other merging road 402, is an event location within the driving zone 404. The driving lane planning unit 33 is notified by the location estimating unit 31 that the current location 400 of the vehicle 10 is on the traffic lane 401a. Since the driving zone 404 includes the merge zone 405, the driving lane planning unit 33 assesses whether or not a lane change is necessary. In the merge zone 405, the vehicle 10 moves from the traffic lane 401a of the road 401 on which it is currently traveling to the traffic lane 402a of the merging road 402, and therefore the driving lane planning unit 33 assesses that the traffic lane where the event is to be carried out at the event location is different from the traffic lane in which the vehicle 10 is currently traveling. The driving lane planning unit 33 therefore assesses that it is necessary to make a lane change from the traffic lane 401a of the current road 401 to the traffic lane 402a of the road 402. The driving lane planning unit 33 also creates a driving lane plan in the driving zone 404 that includes a lane change of the vehicle 10 from the traffic lane 401a of the road 401 to the traffic lane 402a of the road 402, before it reaches the merge zone 405.

Figure 5:
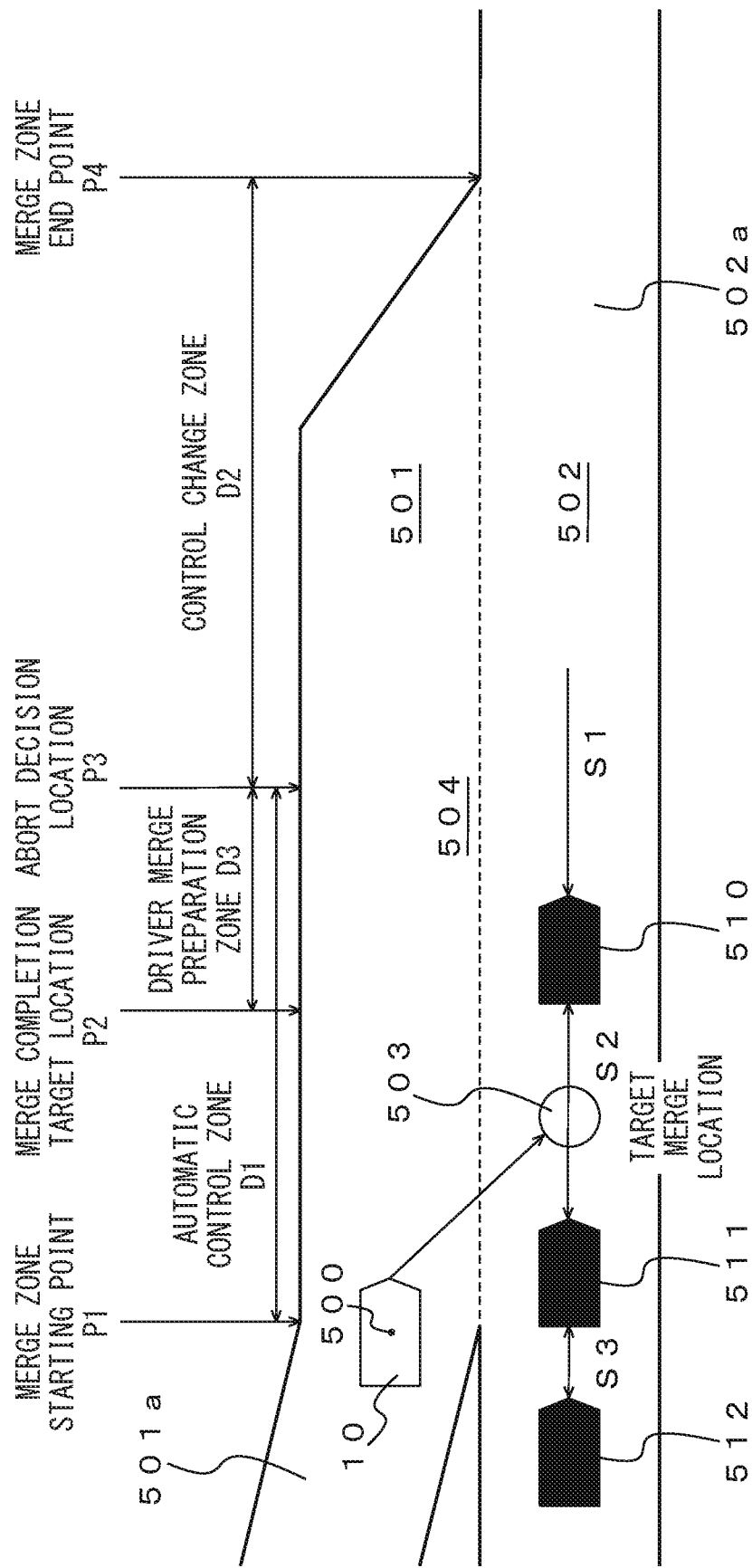
FIG. 5 is a diagram (1) illustrating the processing of a lane change for a merge zone.

Processing whereby the driving lane planning unit 33 creates a driving lane plan that includes a lane change will now be explained with reference to FIG. 5. In the example shown in FIG. 5, the vehicle 10 is traveling on a traffic lane 501a of a road 501. The road 501 merges with a merging road 502 in a merge zone 504. In the merge zone 504, the traffic lane 501a of the road 501 which is the merging lane is adjacent to the traffic lane 502a of the road 502 which is the main lane, and therefore the vehicle 10 is able to move from the traffic lane 501a to the traffic lane 502a. The starting point P1 of the merge zone 504 is a location where connection between the traffic lane 501a and traffic lane 502a begins. The end point P4 of the merging lane is the end point of the traffic lane 501a, which is the merging lane. The driving lane plan includes a lane change by the vehicle 10 from the traffic lane 501a of the road 501 to the traffic lane 502a of the road 502, within the merge zone 504.

When it cannot be ensured that the vehicle 10 will have a safe distance between itself and other vehicles within the merge zone 504, traveling of the vehicle 10 on the current merging lane is continued without a lane change until the situation changes to allow a safe distance to be ensured between itself and other vehicles. When the driving lane planning unit 33 has assessed that a lane change cannot be made by automatic control in the merge zone 504, it determines an "abort decision location P3" where it is decided to halt the lane change by automatic control of the vehicle 10, on the traffic lane 501a in the merge zone 504. The driving lane planning unit 33 determines the abort decision location P3 to be the minimum distance location from the end point P4 in the merge zone 504, at which operation of the vehicle 10 for a lane change can be carried out by the driver to whom control of the vehicle 10 has been handed over. For example, the driving lane planning unit 33 may determine the abort decision location P3 to be a location before the distance to the end point P4 that is calculated as the product of the time required by the driver to recognize the notification of control change of the vehicle 10, begin operating the vehicle 10 for the lane change and complete the lane change (for example, 4 seconds), and the current vehicle speed (for example, the average vehicle speed for the most recent few seconds). The driving lane planning unit 33 may also determine the abort decision location P3 to be a location before the distance to the end point P4 in the merge zone 504 that is estimated to be the distance the vehicle 10 will travel until the vehicle speed reaches zero, based on the deceleration per unit time when the vehicle 10 is braked for deceleration, and on the current vehicle speed. The driving lane planning unit 33 determines the deceleration based on the current vehicle speed and the braking power of the vehicle 10. The driving lane planning unit 33 may also use a predetermined distance (such as 500 m) as the abort decision location P3. Alternatively, the driving lane planning unit 33 may include a margin distance which allows operation of the vehicle 10 by manual control of the driver with a time allowance, in determining the abort decision location P3. The margin distance may be determined either based on the vehicle speed or on a fixed value.

In the merge zone 504, the vehicle 10 attempts to make a lane change from the traffic lane 501a to the traffic lane 502a by automatic control, in an automatic control zone D1 between the starting point P1 of the merge zone 504 and the abort decision location P3. The driving lane planning unit 33 therefore creates a driving lane plan so that a lane change is made from the traffic lane 501a of the road 501 to the traffic lane 502a of the road 502, in the automatic control zone D1 between the starting point P1 of the merge zone 504 and the abort decision location P3.

At an operation plan creation time set with a predetermined cycle, the operation planning unit 34 creates an operation plan representing the planned travel trajectory of the vehicle 10 up until a predetermined time (for example, 5 seconds), based on the map information, the driving lane plan, the current location of the vehicle 10, the surrounding environment information and the vehicle status information. The operation plan is represented as a combination of the target location of the vehicle 10 and the target vehicle speed at the target location, at each time from the current time until the predetermined time. The cycle for the operation plan creation time is preferably shorter than the cycle for the driving lane-planning time. The operation planning unit 34 may determine the target vehicle speed based on a traveling speed input by the driver or on the legal speed limit for the traffic lane in which it is traveling. The operation planning unit 34 notifies the vehicle controlling unit 36 and notification controller 37 of the operation plan for each operation plan created.

When the driving lane plan includes a lane change in which the vehicle 10 is to move between traffic lanes, the operation planning unit 34 estimates future trajectories based on the most recent trajectories of other detected vehicles, using a prediction filter such as a Kalman filter, and determines one or more target locations (such as the target merge location) of the destination after lane changing, on the destination traffic lane, based on relative distances calculated from the traffic lanes on which the other detected vehicles are traveling, and their estimated trajectories. The operation planning unit 34 uses the probability calculating unit 35 to calculate the probability of success of a lane change for each of one or more target locations, and selects a target location with the highest probability of success as the destination target location, to create an operation plan that includes the lane change. The operation planning unit 34 notifies the probability calculating unit 35 of probability calculation information, for calculation of the probability of making a successful lane change, which includes one or more destination target locations, the current location of the vehicle 10, the surrounding environment information and the vehicle status information. When the probability notified by the probability calculating unit 35 for at least one among a single or multiple target locations is above a predetermined threshold value (such as 0.7 to 0.9), the operation planning unit 34 creates an operation plan that includes the target location with the highest probability among the destinations, and notifies the vehicle controlling unit 36. With an operation plan including the target location with the highest probability among the destinations, it is possible to guarantee maximum distance between the vehicle 10 and vehicles in front of and behind it, after the lane change. Processing by which the probability calculating unit 35 calculates probability will be explained below. When all of the probabilities notified by the probability calculating unit 35 for the one or more target locations is below the predetermined threshold value (such as 0.7 to 0.9), the operation planning unit 34 notifies the vehicle controlling unit 36 of an operation plan that does not include a lane change. In this case, the vehicle 10 continues to travel in the traffic lane in which it is currently traveling.

When the operation plan does not include a lane change, or the driving lane plan does not include a lane change, the operation planning unit 34 uses a prediction filter such as a Kalman filter to estimate future trajectories based on the most recent trajectories of other detected vehicles and, based on relative distances calculated from the traffic lanes on which the other detected vehicles are traveling, and their estimated trajectories, it creates an operation plan for the vehicle 10 either so that the other vehicles and the vehicle 10 travel along different traffic lanes, or so that the relative distance from the vehicle 10 to other objects is at least a predetermined distance. The operation planning unit 34 may also create several operation plans based on the driving lane plan. In this case, the operation planning unit 34 may select the operation plan among the multiple operation plans that minimizes the sum of absolute accelerations for the vehicle 10. The operation planning unit 34 notifies the vehicle controlling unit 36 of the operation plan.

For example, when the driving lane plan includes a lane change, the operation planning unit 34 creates an operation plan that does not include a lane change, so that the vehicle 10 does not run parallel to other vehicles running in the destination traffic lane.

When the lane change cannot be completed after running motion for the lane change by the vehicle 10 has been initiated, because the predetermined distance between the vehicle 10 and another vehicle cannot be ensured, or when it has been notified by the probability calculating unit 35 that the probability is below the predetermined threshold value, the operation planning unit 34 cancels the lane change. If any probability notification from the probability calculating unit 35 is above the predetermined threshold value (such as 0.7 to 0.9) while the current location of the vehicle 10 is between the starting point P1 and the abort decision location P3 of the merge zone 504, the operation planning unit 34 notifies the vehicle controlling unit 36 of an operation plan that includes in its destination the target location with the highest probability, and the vehicle 10 again initiates a lane change.

The following is an example in which the operation planning unit 34 creates an operation plan including a lane change from the merging lane to the main lane in a merge zone based on the driving lane plan created by the driving lane planning unit 33.

First, in a merge zone where a merging lane on a scheduled route merges with a main lane, the operation planning unit 34, as an example of a target merge location-determining unit, determines the target merge location where the vehicle 10 is to make a lane change from the merging lane to the main lane, based on map information, a driving lane plan, the current location of the vehicle 10, surrounding environment information and vehicle status information, to be a location before the location at the minimum distance to the end point of the merging lane which allows operation of the vehicle 10 for a lane change by the driver to whom control of the vehicle 10 has been handed over (the abort decision location P3).

Processing by which the operation planning unit 34 creates an operation plan including a lane change will now be explained with reference to FIG. 5. Based on the driving lane plan, the map information, the current location 500 of the vehicle 10, the surrounding environment information including information relating to other vehicles, and the vehicle status information, the operation planning unit 34 determines one or more target merge locations for the destination after the lane change. Based on surrounding environment information that includes information relating to other vehicles, provided from the object detector 32, the operation planning unit 34 is notified that another vehicle 510, another vehicle 511 and another vehicle 512 are traveling in that order on the destination traffic lane 502a. A space S1 is present on the traveling direction side of the other vehicle 510, a space S2 is present between the other vehicle 510 and the other vehicle 511, and a space S3 is present between the other vehicle 511 and the other vehicle 512. The operation planning unit 34 uses a prediction filter such as a Kalman filter to estimate the future trajectories of the other vehicles 510, 511, 512 traveling on the destination traffic lane 502a based on the most recent trajectories of the other vehicles 510, 511, 512 traveling on the destination traffic lane 502a, and it selects one or more spaces that have sizes in which the vehicle 10 can move, and that can serve as destinations that allow safe distances to be ensured between the vehicles that are in front and behind. The operation planning unit 34 sets target merge locations in one or more spaces, and the operation planning unit 34 uses the probability calculating unit 35 to calculate the probability of a successful lane change for each of the one or more target merge locations. The operation planning unit 34 may also set a target merge location at the center of the space, for example. When at least one probability is above a predetermined threshold value (such as 0.7 to 0.9), the operation planning unit 34 decides on the target merge location as the target location with the highest probability, and creates an operation plan including a lane change in a manner that movement is to the target merge location and operation of the vehicle 10 satisfies the predetermined constraints. The predetermined constraints may be upper limits for change in acceleration per unit time, change in speed per unit time, or change in yaw rate per unit time. In the example shown in FIG. 5, the operation planning unit 34 creates an operation plan that includes a lane change for movement to the target merge location 503 in the space S2 between the other vehicle 510 and the other vehicle 511.

Processing whereby the probability calculating unit 35 calculates the probability of success of a lane change will now be explained. When the probability calculating unit 35 is notified of probability calculation information by the operation planning unit 34, it calculates a probability E(t) of a successful lane change for each of one or more target locations, at a probability-calculating time set with a predetermined cycle, based on the operation plan, the current location of the vehicle 10, the surrounding environment information including information resulting to other vehicles, and the vehicle status information. The cycle for the probability-calculating time is preferably shorter than the cycle for the operation plan creation time. The probability calculating unit 35 determines the probability E(t) of a successful lane change, as the product of a first lane change success probability $Q1(D(t))$ calculated based on the location of the vehicle 10, a second lane change success prob-ability $Q2(bth)$ calculated based on a vehicle behind the destination location (corresponding to the other vehicle 511 in FIG. 5), and a third lane change success probability Q3 calculated based on a vehicle in front of the destination location (corresponding to the other vehicle 510 in FIG. 5), according to the following formula (1). The probability calculating unit 35 notifies the operation planning unit 34 of the probability E(t) each time the probability E(t) is calculated for one or more operation plans.

$$E(t)=Q1(D(t))\times Q2(bth)\times Q3 \quad (1)$$

Figure 6:
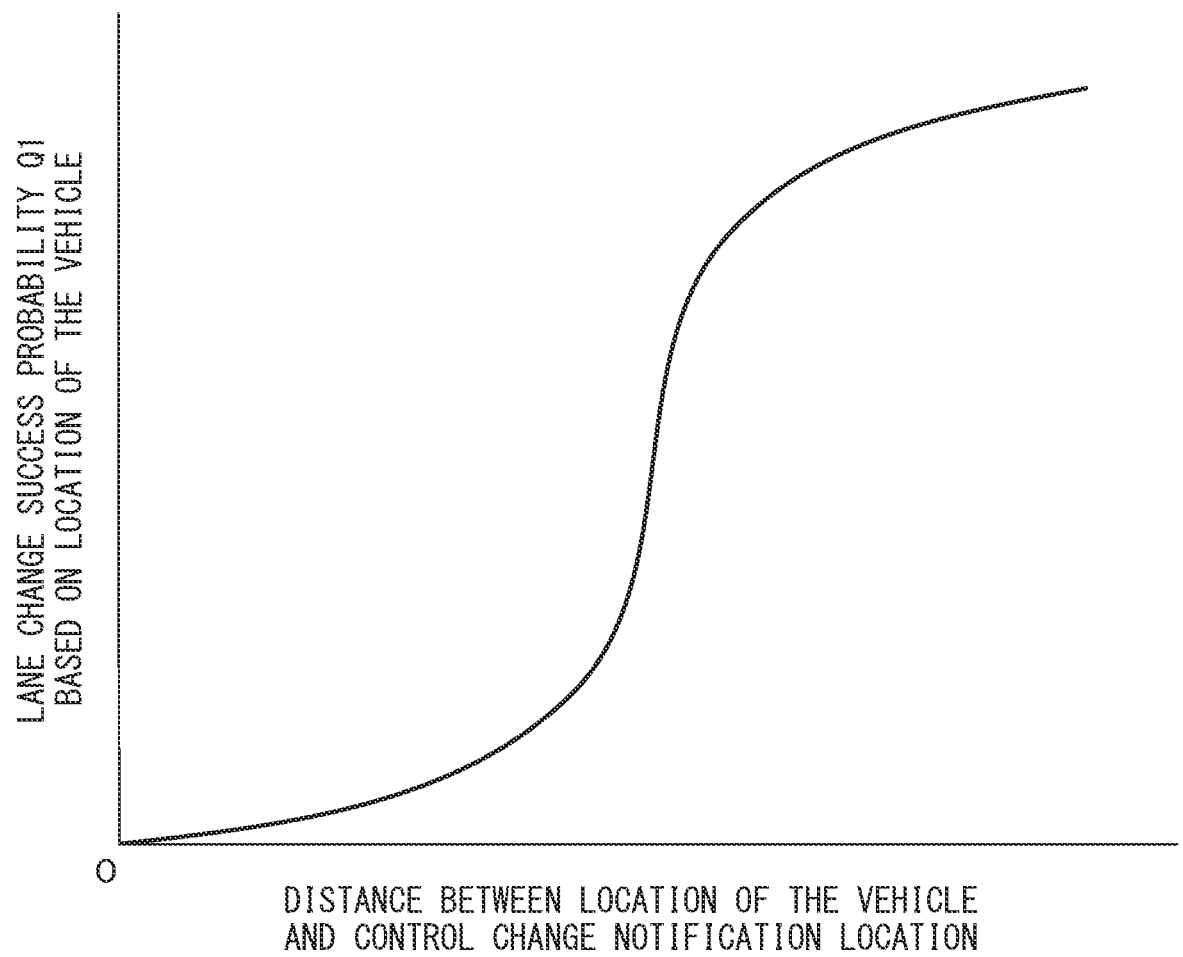
FIG. 6 is a diagram (2) illustrating the processing of a lane change for a merge zone.

FIG. 6 is a graph showing a first lane change success probability $Q1(D(t))$ calculated based on the location of the vehicle 10. The probability calculating unit 35 determines the first lane change success probability $Q1(D(t))$ based on the distance $D(t)$ between the location of the vehicle 10 and the abort decision location. The first lane change success probability $Q1(D(t))$ decreases as the vehicle 10 approaches the abort decision location, becoming zero as the vehicle 10 reaches the abort decision location. The first lane change success probability $Q1(D(t))$, on the other hand, increases as the vehicle 10 recedes from the abort decision location. A sigmoid function, for example, may be used as the first lane change success probability $Q1(D(t))$.

The probability calculating unit 35 calculates the location $K(t)$ of the vehicle 10 at time t using the following formula (2).

$$K(t)=K(t0)+\int_{t0}^{t}(v(t)+a(t)\times t)dt \quad (2)$$

Here, $K(t0)$ is the location of the vehicle 10 at time t0 at which the operation planning unit 34 has begun to attempt a lane change each time. The value of $v(t)$ is the speed of the vehicle 10 at time t. The value of $a(t)$ is the acceleration of the vehicle 10 at time t. When the speed of the vehicle is increased the acceleration is a positive value, and when the speed of the vehicle is decreased the value of the acceleration is a negative value. The value of $K(t)$ is a location vector represented in the world coordinate system, for example. The values of $v(t)$ and $a(t)$ are represented as vector quantities. Decreasing the speed of the vehicle is actually carried out by braking, but the change in speed due to braking is represented in terms of acceleration.

The probability calculating unit 35 determines the distance $D(t)$ between the location of the vehicle 10 and the abort decision location using the following formula (3).

$$D(t)=|S-K(t)| \quad (3)$$

Here, S represents the abort decision location on the traffic lane in which the vehicle 10 is traveling, and it is a location vector represented in the world coordinate system, for example.

The second lane change success probability Q2 calculated based on the vehicle behind the destination space S2 is the probability that the vehicle 10 will pass the vehicle behind the space S2 and move into the space S2. The probability calculating unit 35 determines the second lane change success probability Q2 using the following formula (4).

$$Q2(bth)=\int_{-\infty}^{bth}PB(b)db \quad (4)$$

Here, PB(b) represents the probability distribution function when the vehicle behind is at acceleration (b). The value of (bth) represents an acceleration allowing the vehicle 10 to pass the vehicle behind. The second lane change success probability Q2 is normalized so as to be 1 with integration of acceleration (b) in the interval between $-\infty$ and $\infty$.

As PB(b), the probability calculating unit 35 calculates the average value of acceleration and the variance of acceleration, for example, based on the time-dependent change of acceleration of the vehicle behind that was calculated by the operation planning unit 34 during the latest fixed period, and generates a Gaussian distribution function. As PB(b), the probability calculating unit 35 may also determine a polynomial approximation using multivariate statistical analysis, based on the acceleration of the vehicle behind that was calculated by the operation planning unit 34. As PB, the probability calculating unit 35 may also determine a function representing PB(b,c), using a Gaussian distribution function or multivariate statistical analysis, based on the time-dependent change of acceleration (b) of the vehicle behind and the time-dependent change in the distance c between the vehicle behind and the vehicle ahead which is located ahead of the vehicle behind, which was calculated by the operation planning unit 34 during the latest fixed period. Alternatively, as PB, the probability calculating unit 35 may determine a function representing PB(b,c,d), using a Gaussian distribution function or multivariate statistical analysis, based on the time-dependent change of acceleration (b) of the vehicle behind, the time-dependent change in the distance c between the vehicle behind and the vehicle ahead which is located ahead of the vehicle behind, and the time-dependent change in the vehicle speed d of the vehicle ahead, which was calculated by the operation planning unit 34 during the latest fixed period.

The probability calculating unit 35 may also determine the value of (bth) in the following manner. First, the probability calculating unit 35 decides on a target merge location in the destination traffic lane 502a, in the space S2 in which the vehicle 10 is to move, and determines the distance S between the target merge location and the vehicle 10. The target merge location is a location before the abort decision location, and it may be a location at a predetermined distance (such as 30 m) ahead of the current location of the vehicle 10, for example, as the initial value of the target merge location. The vehicle 10 catches up to the vehicle behind after a time T. The probability calculating unit 35 calculates an acceleration (a) of the vehicle 10 satisfying equation (5) below, using the distance S, the time T, the acceleration (b) of the vehicle behind (a constant) and the acceleration (a) of the vehicle 10 (where "a" is a larger constant than "b"). The probability calculating unit 35 may use the average value of the probability distribution function PB(b) for the acceleration of the vehicle behind as the acceleration (b) of the vehicle behind. The initial value for time T may be 10 seconds, for example.

$$S = \iint_{t_0}^{T}(a-b)dt^2 \qquad (5)$$

The probability calculating unit 35 determines an acceleration (a) of the vehicle 10 satisfying equation (5), with a fixed target merge location, while varying the time T so that it increases by a predetermined amount. If the calculated acceleration (a) of the vehicle 10 is below a predetermined threshold value, the probability calculating unit 35 uses the acceleration (a) as the value of (bth). The predetermined threshold is preferably an acceleration which does not produce discomfort for the driver, and it may be 0.1 to 0.3 m/s$^2$, for example. When an acceleration (a) below the predetermined threshold value is not found with a fixed target merge location, the probability calculating unit 35 increases the target merge location by a predetermined amount and then gradually varies the time T by a predetermined amount while repeating the process of calculating an acceleration (a) of the vehicle 10 that satisfies equation (5). When the target merge location is a location ahead of the abort decision location and an acceleration (a) below the threshold is not found, the probability calculating unit 35 sets the second lane change success probability Q2 to be zero.

The third lane change success probability Q3 calculated based on the vehicle ahead of the destination location represents the probability that the vehicle ahead will accelerate and cause the space S2 to widen. The probability calculating unit 35 determines the third lane change success probability Q3 using the following equation (6).

$$Q3 = \int_0^\infty PC(c)dc \qquad (6)$$

Here, the probability distribution function PC(c) represents the probability distribution function when the vehicle ahead is at acceleration (c). The third lane change success probability Q3 is normalized so as to be 1 with integration of acceleration (c) in the interval between $-\infty$ and $\infty$.

The probability calculating unit 35 determines the probability distribution function PC(c) in the same manner as the probability distribution function PB(b).

When no other vehicle is present in the traffic lane 502a around the vehicle 10, the second lane change success probability Q2 and the third lane change success probability Q3 are both values close to 1, and therefore the probability E is essentially determined by the first lane change success probability Q1.

The operation planning unit 34 also decides on a merge completion target location P2, between the target merge location set at the planning time for the first lane change in the merge zone 504 (hereunder also referred to as "first target merge location") and the abort decision location P3, which is the target for the vehicle 10 completing the lane change from the merging lane to the main lane. The operation planning unit 34 notifies the notification controller 37 of the merge completion target location P2. For example, the operation planning unit 34 may determine the merge completion target location P2 to be a location before the abort decision location P3 by a predetermined distance. The predetermined distance may also be changed depending on the vehicle speed, for example. After the first target merge location has been set in the merge zone 504, the operation planning unit 34 may set the merge completion target location P2 to be the location of the vehicle 10 at the point where the probability has fallen below a predetermined threshold value.

The vehicle controlling unit 36 controls each unit of the vehicle 10 based on the location of the vehicle 10 at the positioning time and the vehicle speed and yaw rate, as well as on the notified operation plan (including the lane change plan), so that the vehicle 10 travels along the notified scheduled route. For example, the vehicle controlling unit 36 determines the steering angle, acceleration and angular acceleration of the vehicle 10 according to the notified operation plan and the current vehicle speed and yaw rate of the vehicle 10, and sets the amount of steering, and the accelerator or brake level so as to match that steering angle, acceleration and angular acceleration. The vehicle controlling unit 36 also outputs a control signal corresponding to a set steering amount, to an actuator (not shown) that controls the steering wheel for the vehicle 10. The vehicle controlling unit 36 also determines the amount of fuel injection according to a set accelerator level, and outputs a control signal corresponding to the amount of fuel injection to a drive unit (not shown) of the engine of the vehicle 10. Alternatively, the vehicle controlling unit 36 may output a control signal corresponding to a set brake level to the brake (not shown) of the vehicle 10.

When the operation plan includes a combination of a target trajectory and target vehicle speed for a lane change, the vehicle controlling unit 36 controls the running motion of the vehicle 10 so that a lane change is performed.

When the lane change has not been completed by the time the vehicle 10 has reached the first target merge location, the notification controller 37 either gives the driver a first control change notification notifying that control of the vehicle 10 will be switched from automatic control to manual control, by using the UI 6, or gives the driver a notification by using the vehicle controlling unit 36 that controls operation of the vehicle 10 to perform a predetermined operation of the vehicle 10. The notification controller 37 determines the point at which the vehicle 10 has reached the first target merge location, based on the current location of the vehicle 10, the operation plan and the map information, and assesses at that time whether or not the lane change has been completed, based on the traffic lane in which the vehicle 10 is currently traveling, and the driving lane plan.

When the lane change has not been completed at the point where the vehicle 10 has reached the first target merge location, for example, the notification controller 37 uses the UI 6 to display a control change notification, and indicate that the lane change cannot be made by automatic control. When the lane change has not been completed by the time the vehicle 10 has reached the first target merge location, the notification controller 37 controls the vehicle controlling unit 36 to either reduce the speed of the vehicle 10, or to change the speed of the vehicle 10 so as to reduce the difference with the speed of the other vehicle traveling in the main lane. The driver can thus confirm the surrounding situation when the vehicle 10 is to be operated by manual control, facilitating the lane change to the main lane. Incidentally, the notification controller 37 may notify the driver of the first control change notification using both the UI 6 and the vehicle controlling unit 36.

The UI 6 inputs an operation signal of the driver in response to the first control change notification, and outputs it through the in-vehicle network 11 to the ECU 9. When the driver has acknowledged the first control change notification, the operation planning unit 34 switches operation of the vehicle 10 from the current automatic control operating mode to manual control operating mode. The driver who has acknowledged the first control change notification operates the vehicle 10 in manual control operating mode so as to perform the lane change relating to the notification. The manual control performed in manual control operating mode preferably includes at least steering. The manual control in manual control operating mode may also be steering, acceleration and braking. When the driver has not acknowledged the control change notification, the operation planning unit 34 continues operation of the vehicle 10 in automatic control operating mode. When the lane change has not been completed by the time the vehicle 10 has reached the abort decision location P3, and the driver has not acknowledged the control change notification, the operation planning unit 34 may control the vehicle 10 so that the vehicle 10 stops before it reaches the end point P4 of the merge zone 504.

When the vehicle 10 has reached the merge completion target location P2 after the driver has been notified with the first control change notification, the notification controller 37 uses the UI 6 or vehicle controlling unit 36 to give the driver notification of a second control change notification notifying that control of the vehicle 10 may be changed from automatic control to manual control. The notification controller 37 assesses whether or not the vehicle 10 has reached the merge completion target location P2, based on the current location of the vehicle 10, the driving lane plan and the map information. The notification controller 37 gives the driver the second control change notification while the vehicle 10 is traveling in a driver merge preparation zone D3 between the merge completion target location P2 and the abort decision location P3.

As mentioned above, the merge completion target location P2 may be a location ahead of the abort decision location P3 by a predetermined distance, or it may be the location of the vehicle 10 at the point where the probability has fallen below the predetermined threshold value after having set the first target merge location in the merge zone 504. The notification controller 37 preferably provides the second control change notification in a manner that can be more easily recognized by the driver than the first control change notification (in an emphasized way). This allows the driver to be made more aware of the possibility of operating the vehicle 10 by manual control for the lane change operation to the main lane.

For example, when the vehicle 10 has reached the merge completion target location P2, the notification controller 37 uses the vehicle controlling unit 36 to change the acceleration in the traveling direction of the vehicle 10 or in a direction crossing the traveling direction, by braking action or steering action, and to give the driver the second control change notification. This allows the driver, traveling with automatic control, to be made further aware of the possibility that control of the vehicle 10 may change from automatic control to manual control in the currently traveling merge zone 504.

The notification controller 37 may also use the UI 6 to display the possibility that control of the vehicle 10 may change from automatic control to manual control in the currently traveling merge zone 504, for notifying the driver by the second control change notification.

The UI 6 inputs an operation signal of the driver in response to the second control change notification, and outputs it through the in-vehicle network 11 to the ECU 9. When the driver has acknowledged the second control change notification, the operation planning unit 34 switches operation of the vehicle 10 from the current automatic control operating mode to manual control operating mode.

As mentioned above, even when the operation planning unit 34 has canceled a lane change, after having begun running motion whereby the vehicle 10 is to make the lane change toward the first target merge location, it again attempts a lane change with automatic control until the vehicle 10 reaches the abort decision location P3, as long as the driver has still not acknowledged the control change notification.

Figure 7:
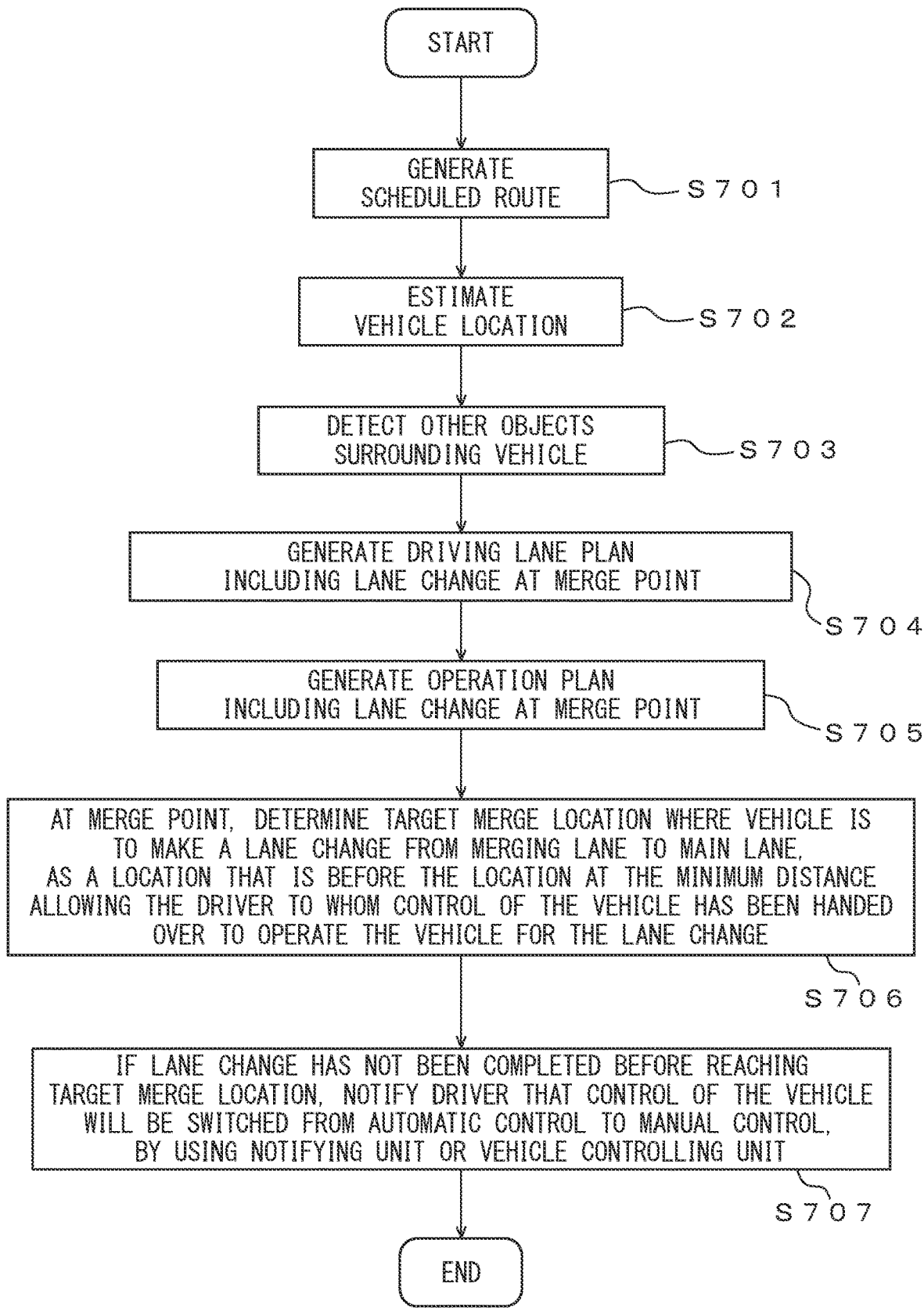
FIG. 7 is an operation flow chart for a vehicle control system that includes vehicle control processing.

FIG. 7 is an operation flow chart for vehicle control processing that includes control change notification processing, carried out by the processor 23. In the operation flow chart shown below, the processing in steps S706 and S707 correspond to control change notification processing when it has been assessed that a lane change cannot be made by automatic control.

First, the navigation device 8 produces a scheduled route from the current location of the vehicle 10 to the destination, based on navigating map information, the destination of the vehicle 10 and the current location of the vehicle 10 (step S701).

The location estimating unit 31 of the processor 23 then determines the estimated location and estimated declination of the vehicle 10 for each positioning time (step S702).

Next, the object detector 32 of the processor 23 detects other objects around the vehicle 10 based on an image produced by the camera 2 and on reflected wave information generated by the LiDAR sensors 3a to 3d (step S703).

The driving lane planning unit 33 of the processor 23 then selects a traffic lane on the road on which the vehicle 10 is traveling, in the driving zone of the scheduled route, and creates a driving lane plan. The driving lane planning unit 33 also assesses whether or not a lane change is necessary from the merging lane to the main lane in the merge zone in the driving zone of the scheduled route, based on the map information, the scheduled route, the current location of the vehicle 10, the surrounding environment information and the vehicle status information. When it has been assessed that a lane change from the merging lane to the main lane is necessary, the driving lane planning unit 33 creates a driving lane plan that includes the lane change (step S704).

Next, the operation planning unit 34 of the processor 23 creates an operation plan whereby the vehicle 10 makes a lane change from the merging lane to the main lane in the merge zone, based on the driving lane plan, the current location of the vehicle 10, the surrounding environment information and the vehicle status information (step S705).

For a merge zone where a merging lane merges with a main lane on a scheduled route, the operation planning unit 34 of the processor 23 subsequently decides on a target merge location where the vehicle is to make a lane change from the merging lane to the main lane, as a location that is before the location at the minimum distance to the end point of the merging lane (the end point of the merge zone) allowing the driver to whom control of the vehicle has been handed over to operate the vehicle for the lane change (the abort decision location) (step S706).

When the lane change has not been completed by the time the vehicle 10 has reached the target merge location, the notification controller 37 of the processor 23 then either gives the driver a first notification notifying that control of the vehicle 10 will be switched from automatic control to manual control, by using the UI 6, or gives the driver a notification using the vehicle controlling unit 36 to control operation of the vehicle 10 to perform a predetermined operation (step S707).

As explained above, for a merge zone where a merging lane merges with a main lane on a scheduled route, the vehicle control device decides on the target merge location where the vehicle is to make a lane change from the merging lane to the main lane, as a location that is before the location at the minimum distance to the end point of the merging lane that allows the driver to whom control of the vehicle has been handed over to operate the vehicle for the lane change. When the lane change has not been completed by the time the vehicle has reached the minimum distance location, the vehicle control device either gives the driver a first notification notifying that control of the vehicle will be switched from automatic control to manual control, by using a notifying device that notifies the driver of information, or gives the driver a notification by using the vehicle controlling device that controls operation of the vehicle to perform a predetermined operation of the vehicle. Since the driver is notified in advance that it is difficult to make a lane change from the merging lane to the main lane by automatic control before the vehicle can no longer make a lane change by automatic control, the driver to whom control of the vehicle has been handed over has ample time to carry out the procedure of lane change from the merging lane to the main lane.

A modified example of the embodiment described above will now be explained. In this modified example, the notification controller 37 uses the UI 6 to notify the driver of information indicating that the vehicle 10 will make a lane change from the merging lane to the main lane (notification information), after the operation planning unit 34 has determined the first target merge location.

The notification information used by the notification controller 37 may be the distance between the current location of the vehicle 10 and the abort decision location, or a probability, for example. The notification controller 37 may use the UI 6 to display the distance between the current location of the vehicle 10 and the abort decision location as a progress bar. The notification controller 37 may also use the UI 6 to display the probability with different colors to indicate the numerical values corresponding to the relationship with the threshold value.

Alternatively, the notification controller 37 may use the UI 6 to display past success rates for time or calendar periods, in cases where the merge zone has previously been traveled and the success rates for past lane changes in the merge zone have been stored for time or calendar periods.

The vehicle control device and storage medium which stores a computer program for vehicle control according to the embodiment described above may incorporate appropriate modifications that are still within the gist of the invention. Moreover, the technical scope of the invention is not limited to this embodiment, and includes the invention and its equivalents as laid out in the Claims.

For example, when a lane change has not been completed by the time the vehicle 10 has reached the first target merge location, the notification controller 37 of the embodiment described above notifies the driver that control of the vehicle 10 will be changed from automatic control to manual control. However, instead of the first target merge location, the notification controller 37 may use a target merge location set by the operation planning unit 34 at a planning time for a second or later lane change in the merge zone.

The method of calculating the probability of making a successful lane change is not limited to the embodiment described above. For example, the probability calculating unit may use the latest average inter-vehicular distance in the destination traffic lane (over several minutes, for example) to calculate the probability as well. Alternatively, the probability calculating unit may use the relationship between the vehicle speed and the speed distribution of the most recent other vehicle traveling in the destination traffic lane (in the past several minutes, for example), to calculate the probability.

All examples and conditional language recited herein are intended for pedagogical purposes to aid the reader in understanding the invention and the concepts contributed by the inventor to furthering the art and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions and alterations could be made hereto without departing from the spirit and scope of the invention.

The invention claimed is:

1. A vehicle control device comprising a processor configured to determine a target merge location where the vehicle is to make a lane change from a merging lane to a main lane, in a merge zone on a scheduled route where the merging lane merges with the main lane, as a location that is before a location at a minimum distance to an end point of the merging lane allowing the driver to whom control of the vehicle has been handed over to operate the vehicle for the lane change, and when the vehicle has not completed the lane change upon reaching the target merge location, give the driver a first notification notifying that control of the vehicle will be switched from automatic control to manual control, by using a notifying device that notifies the driver of information, or by using a vehicle controlling device that controls operation of the vehicle to perform a predetermined operation of the vehicle.

2. The vehicle control device according to claim 1, wherein the processor is configured to control the vehicle controlling device to either reduce the speed of the vehicle or to vary the speed of the vehicle so that the difference with the speed of the other vehicle traveling in the main lane is reduced, as a predetermined operation.

3. The vehicle control device according to claim 1, wherein the processor is configured to determine a merge completion target location, which is the target where lane change of the vehicle from a merging lane to a main lane is to be completed, between the target merge location and a minimum distance location, and when the vehicle has reached the merge completion target location after the first notification, give a second notification notifying that control of the vehicle may be switched from automatic control to manual control to the driver, by using the notifying device or vehicle controlling device.

4. The vehicle control device according to claim 3, wherein the processor is configured to change the acceleration of the vehicle by braking action or steering action by using the vehicle controlling device in order to give the driver the second notification.

5. The vehicle control device according to claim 1, wherein the processor is configured to notify information indicating that the vehicle is to make a lane change from the merging lane to the main lane by using the notifying device to the driver, after the target merge location has been determined.

6. The vehicle control device according to claim 1, wherein the processor is configured to determine the minimum distance location based on the location of the end point of the merging lane, the current location of the vehicle and the vehicle status information.

7. A computer readable non-transitory storage medium storing computer-executable program instructions for vehicle control that, when executed, cause a processor to determine a target merge location where the vehicle is to complete a lane change from a merging lane to a main lane, in a merge zone on a scheduled route where the merging lane merges with the main lane, as a location that is before a location at a minimum distance to an end point of the merging lane allowing the driver to whom control of the vehicle has been handed over to operate the vehicle for the lane change, and when the vehicle has not completed the lane change upon reaching the target merge location, give the driver a notification notifying that control of the vehicle will be switched from automatic control to manual control, by using a notifying device that notifies the driver of information, or by using a vehicle controlling device that controls operation of the vehicle to perform a predetermined operation of the vehicle.

\* \* \* \* \*